(12) United States Patent
Guillot et al.

(10) Patent No.: US 6,384,403 B1
(45) Date of Patent: May 7, 2002

(54) BICHROMATIC OPTICAL CELL

(75) Inventors: Alain Guillot, Fleac; Frédéric Couillaud, Angouleme, both of (FR)

(73) Assignee: Schneider Electric Industries S.A., Rueil-Malmaison (FR)

( * ) Notice: Subject to any disclaimer, the term of this patent is extended or adjusted under 35 U.S.C. 154(b) by 0 days.

(21) Appl. No.: 09/534,459

(22) Filed: Mar. 27, 2000

(30) Foreign Application Priority Data

Apr. 23, 1999 (FR) .............................. 99 05224

(51) Int. Cl.$^7$ .............................. G01J 3/50; H01J 5/16; H01J 40/14
(52) U.S. Cl. ..................................... 250/226
(58) Field of Search ........................ 250/222.1, 223 R, 250/223 B, 224, 225, 226; 209/580

(56) References Cited

U.S. PATENT DOCUMENTS 4,580,280 A * 4/1986 Hetrick ........................ 377/6
4,649,270 A    3/1987 Goldenberg
5,265,732 A * 11/1993 Long ........................... 209/580

FOREIGN PATENT DOCUMENTS

| DE | 297 11 259 | 10/1997 |
| EP | 0 005 852  | 12/1979 |
| EP | 0 329 083  | 8/1989  |

* cited by examiner

*Primary Examiner*—Robert H. Kim
*Assistant Examiner*—Courtney Thomas
(74) *Attorney, Agent, or Firm*—Oblon, Spivak, McClelland, Maier & Neustadt, P.C.

(57) ABSTRACT

A bichromatic optical cell fitted with two emitters 11, 12 capable respectively of generating a first beam E1 and a second beam E2 of different wavelengths $\lambda 1$, $\lambda 2$, and a receiver 14 arranged in a manner to receive, at a fixed or a variable angle of incidence, a beam reflected or able to be influenced by an object, coming from one or other of the emitters. Means 15, 16 of polarizing the first beam E1 are provided and the cell is fitted with means S of selecting a mode of operation M1 of the polarized reflex type or a second mode of operation M2 of the proximity type. The selection means S activate one or other of the emitters 11, 12 depending on the mode selected and block one or other of the output channels 14a, 14b of the receiver 14 and/or configure one active optical receiving area 14c of the receiver.

18 Claims, 1 Drawing Sheet

BICHROMATIC OPTICAL CELL

Figure 1:
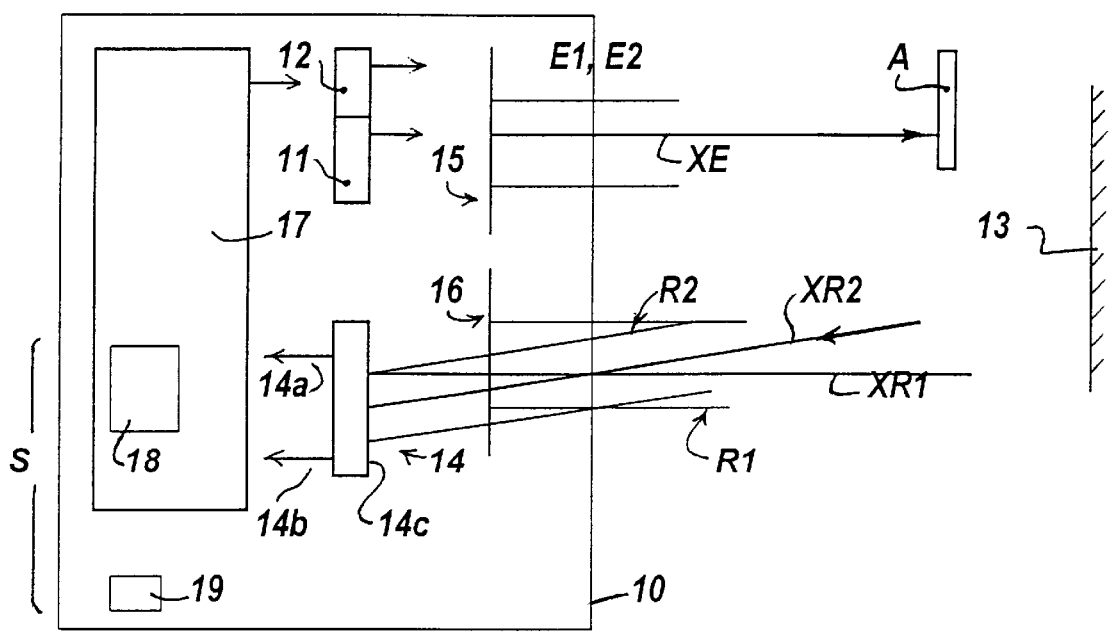

This invention relates to a bichromatic optical cell capable of detecting an object either by interruption of a reflection caused by a reflector, without utilizing the angle of incidence of the received beam, in a mode called a reflex mode, or by reflection onto an object utilizing a variation in the angle of incidence of the received beam,—by a triangulation effect—, in a mode called a proximity mode.

Depending on the distance of the object to be detected, its brightness or its color or indeed local detection conditions, it is desirable to use a reflex cell in certain cases, and a proximity cell in other cases. The usual cells designed to function in reflex mode are not able to function in proximity mode and vice versa.

Nevertheless, in document EP-329 083, a bichromatic cell with a broad detection ability has been proposed. This cell, in cases of red and infrared emissions, is combined with a special reflector that absorbs the infrared, and comprises a special receiver component with two photodiodes, one dedicated to the red light and the other to the infrared light. A bichromatic cell has also been envisaged that allows one to detect bright objects only in the reflex mode (document FR-2 442 457). Apart from this disadvantage of not being able to operate in proximity mode, such a cell requires a specific reflector in order to eliminate one of the wavelengths. Such special reflectors are expensive.

An objective of the invention is to provide a photoelectric cell capable of operating in reflex mode or in proximity mode, through inexpensive and efficient means that notably exclude the need for a specific reflector.

The invention relates to a photoelectric cell comprising two emitters capable respectively of generating a first beam and a second beam of different wavelengths, and a receiver arranged in a manner to receive, at a fixed or a variable angle of incidence, a beam able to be influenced by an object, from one or other emitter.

According to the invention, the photoelectric cell comprises means of polarizing the first beam, the receiver and the cell being fitted with means of selecting a first operating mode, notably of the polarized reflex type, or a second operating mode, notably of the proximity type, which activates one or other of the emitters depending on the mode selected.

Preferably, the receiver has at least two output channels connected to a processing circuit and capable of supplying respective signals the ratio of which varies according to a monotone function of the distance of the object, while the means of operational selection are capable of blocking one or other of the output channels from the receiver and/or of configuring an active optical receiving area of the receiver. The selection of the operating mode of the cell can be carried out automatically or in a manual way.

A non-limitative embodiment of the invention will now be described below, making reference to the appended drawing.

FIG. 1 diagrammatically represents a bichromatic cell conforming to the invention.

The optical cell 10 is capable of operating in reflex mode M1, or in proximity mode M2. The operating mode M1, M2 of the cell is chosen using selection means S.

The cell 10 comprises two optical emitter units 11, 12 capable respectively of emitting a beam El of wavelength $\lambda 1$ and a beam E2 of wavelength $\lambda 2$ which is different to $\lambda 1$. E1 can be red light and E2 can be infrared light. The emitters 11, 12 can be produced either using two separate components or using two light sources assembled within one and the same component. When there are separate components, they can be associated with one and the same emission axis XE by means of a semi-transparent plate or other optical system suitable for producing a single source image from separate sources.

The beam E1 is reflected in reflex mode by an ordinary reflector 13, being broken when an object A is confronted, and the beam E2 is reflected in proximity mode when the object A is confronted. A receiver unit 14 is sensitive to the resulting beam R1, R2. The emitted beam E1, E2 passes through a filter 15 polarizing only the light of wavelength $\lambda 1$, but not that of wavelength $\lambda 2$, and the reflected beam R1, R2 passes through a filter 16 polarizing at $\lambda 1$, but not at $\lambda 2$. It should be noted that the cell described does not use a special reflector.

The receiver unit 14 is fitted in such a way as to be able to supply a signal of the presence of reflector 13 or a signal of the distance of object A both in polarized reflex mode M1, the reflected beam being in axis XR1, and in proximity mode (triangulation) M2, where the reflected beam has a variable inclined axis XR2. The receiver unit 14 includes an optically sensitive surface the active area of which can be configured in a way to accept both beam R1 ($\lambda 1$) and beam R2 ($\lambda 2$), the angle of incidence of which, and hence the position on the surface, varies with the distance of the object A. In the present example, the receiver unit 14 is a component with two outputs 14a, 14b, for example of the PSD type, supplying two electrical signals sa, sb whose relative variation is an analog representation of the distance of the object, or another component—or group of components—the optically sensitive area of which can be configured as a function of the selected mode and/or an output from which can be blocked as a function of the selected mode (for example the reflex mode).

A processing circuit 17 is provided to supply the emitters 11, 12 to generate electrical emission signals, to analyze the electrical reception signals sa, sb supplied on the two outputs 14a, 14b from the receiver 14 and, as a consequence, activate one or other emitter 11, 12 and configure the receiver 14. The analysis under consideration can notably be carried out by comparison with the threshold of the ratio of the signals from channels 14a, 14b, a ratio which, in proximity mode, varies with the distance of the object in a monotone fashion.

The selection means S comprise a selection device 18 which acts on the emitters and the receiver in order to adapt the cell to operation in reflex mode or in proximity mode. Hence, the selection device 18 will inhibit the emitter that is not used in the mode selected by activating emitter 11 and deactivating emitter 12 in reflex mode, and conversely in proximity mode. It also acts on the receiver 14 to adapt it to the mode selected, for example, by blocking one of its output channels 14a, 14b, or by configuring is optical receiving area 14c in a way that makes it totally or partially active.

The operating mode selection means S may also comprise a manual selector 19 that can also be controlled remotely. This selector may be mechanical or electrical.

What is claimed is:

1. A bichromatic optical cell, comprising:
   first and second emitters configured to emit first and second beams having different wavelengths towards an objected to be detected;
   a receiver configured to receive at a fixed or a variable angle of incidence, first and second reflected beams corresponding to the first and second emitted beams;
   a polarizer configured to polarize the first emitted beam and to allow the second emitted beam to pass therethrough without polarizing the second emitted beam;

a selection device configured to select one of a first operating mode corresponding to a polarized reflex mode and a second operating mode corresponding to a proximity mode; and a processing circuit configured to receive and process signals respectively output by at least first and second output channels of the receiver, wherein a ratio of the signals output by the at least first and second output channels varies in accordance with a monotone function of a distance of the object from the optical cell.

2. The cell according to claim 1, wherein the first and second emitters comprise a single component.

3. The cell according to claim 1, wherein the first and second emitters comprise separate components.

4. The cell according to claim 1, wherein:

the selection device comprises a selection circuit associated with the processing circuit, first and second emitters, and the receiver, and wherein the processing circuit analyzes a value of the signals output by the at least first and second output channels, and commands the selection circuit to operate the first and second emitters and the receiver based on the analyzed value.

5. The cell according to claim 1, wherein the selection device includes a manual selector.

6. The cell according to claim 1, wherein the polarizer comprises a first polarizer configured to polarize the first emitted beam and to allow the second emitted beam to pass therethrough without polarizing the second emitted beam, and a second polarizer configured to polarize the first reflected beam and to allow the second reflected beam to pass therethrough without polarizing the second reflected beam.

7. The cell according to claim 1, wherein the selection device selects one of the first and second operating modes by activating the first emitter and inhibiting the second emitter or by activating the second emitter and inhibiting the first emitter.

8. The cell according to claim 1, wherein the selection device selects one of the first and second operating modes by blocking a corresponding one of the at least two output channels of the receiver.

9. The cell according to claim 8, wherein one of the at least two output channels is blocked by configuring an active optical receiving area of the receiver.

10. A bichromatic optical cell system, comprising:

first and second emitter means for emitting first and a second beams having different wavelengths towards an objected to be detected;

receiver means for receiving at a fixed or a variable angle of incidence, first and second reflected beams corresponding to the first and second emitted beams;

polarizing means for polarizing the first emitted beam and for allowing the second emitted beam to pass therethrough without polarizing the second emitted beam;

selection means for selecting one of a first operating mode corresponding to a polarized reflex mode and a second operating mode corresponding to a proximity mode; and processing means for receiving and processing signals respectively output by at least first and second output channels of the receiver means, wherein a ratio of the signals output by the at least first and second output channels varies in accordance with a monotone function of a distance of the object from the optical cell.

11. The cell according to claim 10, wherein the first and second emitter means comprise a single component.

12. The cell according to claim 10, wherein the first and second emitter means comprise separate components.

13. The cell according to claim 10, wherein:

the selection means includes a selection circuit associated with the processing circuit, first and second emitters, and the receiver, and wherein the processing means analyzes a value of the signals output by the at least first and second output channels, and commands the selection means to operate the first and second emitter means and the receiver means based on the analyzed value.

14. The cell according to claim 10, wherein the selection means includes a manual selector.

15. The cell according to claim 10, wherein the polarizing means comprises a first polarizer means for polarizing the first emitted beam and for allowing the second emitted beam to pass therethrough without polarizing the second emitted beam, and a second polarizer means for polarizing the first reflected beam and for allowing the second reflected beam to pass therethrough without polarizing the second reflected beam.

16. The cell according to claim 10, wherein the selection means selects one of the first and second operating modes by activating the first emitter means and inhibiting the second emitter means or by activating the second emitter means and inhibiting the first emitter means.

17. The cell according to claim 10, wherein the selection means selects one of the first and second operating modes by blocking a corresponding one of the at least two output channels of the receiver means.

18. The cell according to claim 17, wherein one of the at least two output channels is blocked by configuring an active optical receiving area of the receiver means.

* * * * *